United States Patent [19]

Leo

[11] Patent Number: 4,540,360

[45] Date of Patent: Sep. 10, 1985

[54] APPARATUS FOR PRODUCING A WOUND COIL OF AN ELASTIC MATERIAL

[76] Inventor: Reinhard W. Leo, Giessener Strasse 38, 6057 Dietzenbach, Fed. Rep. of Germany

[21] Appl. No.: 629,502

[22] Filed: Jul. 10, 1984

[30] Foreign Application Priority Data

Jul. 26, 1983 [DE] Fed. Rep. of Germany ....... 3326858

[51] Int. Cl.³ .............................................. B29C 25/00
[52] U.S. Cl. ..................................... 425/384; 425/391; 425/393; 425/403.1
[58] Field of Search ............... 425/383, 384, 393, 403, 425/403.1, 391

[56] References Cited

U.S. PATENT DOCUMENTS

| | | | |
|---|---|---|---|
| 1,522,987 | 1/1925 | Turner | 425/383 X |
| 1,534,622 | 4/1925 | Wandel | 425/383 X |
| 2,961,736 | 11/1960 | Kier | 425/383 X |
| 3,121,256 | 2/1964 | Fleisher | 425/391 |
| 4,182,738 | 1/1980 | Casaert et al. | 425/391 X |
| 4,247,271 | 1/1981 | Yonekura et al. | 425/384 X |
| 4,318,210 | 3/1982 | Foster et al. | 425/383 X |
| 4,349,490 | 9/1982 | Bos | 425/393 X |
| 4,416,601 | 11/1983 | Hasegawa et al. | 425/384 X |

Primary Examiner—J. Howard Flint, Jr.
Attorney, Agent, or Firm—Wenderoth, Lind & Ponack

[57] ABSTRACT

A wound coil of an elastic material is formed by feeding a monofilament of elastic material over a winding coil of a coiling head onto a mandrel to form a coil. A pair of conveyors are located on opposite sides of the coil on the mandrel and define therebetween a stabilizing zone for moving the coil along the mandrel through such zone while heating and thereby stabilizing the coil. The conveyors include respective heating elements located on opposite sides of the coil and respective planar members formed of a heat transmitting material and between which the coil is fed along the mandrel. Each planar member is in contact with the coil and a respective heating element.

10 Claims, 2 Drawing Figures

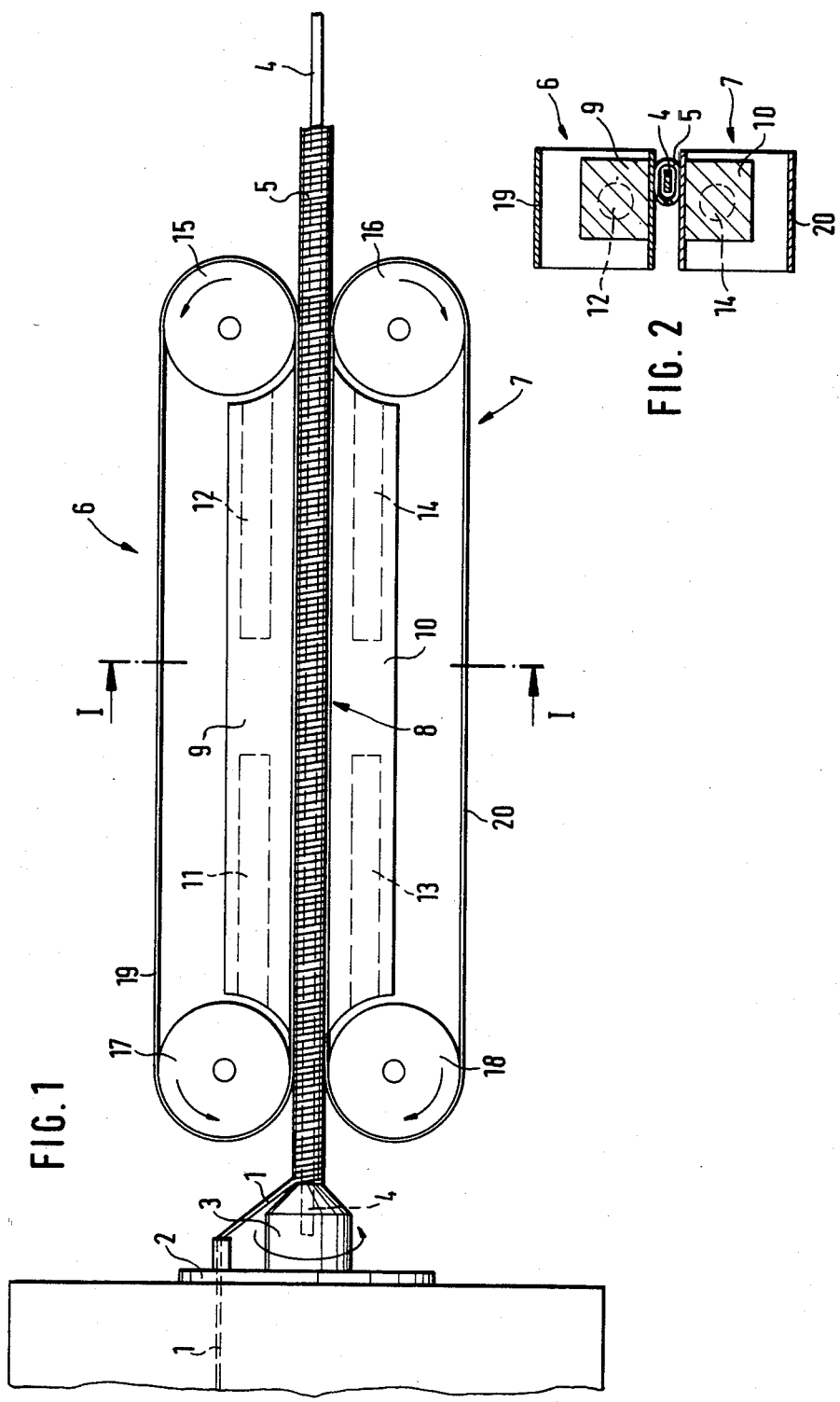

APPARATUS FOR PRODUCING A WOUND COIL OF AN ELASTIC MATERIAL

BACKGROUND OF THE INVENTION

The present invention relates to an apparatus for producing a wound coil from an elastic material, for example a plastic material such as polyester or polyamide. More specifically, the present invention relates to such an apparatus for producing continuously a wound coil of such a material, for example from thermoplastic monofilaments, whereby the material stabilizes upon the application of heat.

There is known, for example from DE-AS 11 52 529, an apparatus of this general type wherein a feed mechanism supplies thermoplastic monofilaments through a coiling head over a winding cone to a winding mandrel which has a length to extend at least through a stabilizing conduit or zone, through which the wound coil is fed while being heated, thereby stabilizing the coil. In this known apparatus, the wound coil is fed by two screw conveyors provided in the stabilizing conduit, thereby resulting in parting of the coil, which is undesirable for certain applications. The capacity of this known apparatus is limited by the screw conveyor transmission system, since the contact surface of the wound coil at the screw conveyor melts due to additional friction heat.

In other known devices, a wound coil is passed through a stationary conduit or zone and is heated therein for stabilization, for example by infrared radiation. In this type of apparatus, polyester which need only be heated slightly in order to be stabilized can be handled with relative ease. For polyamides however, which must be heated to approximately 150° to 260° C. to be stabilized, this known system results in considerable problems.

Thus, to bring an endlessly moving polyamide monofilament to a temperature of 150° to 260° C. by means of radiant heat, a relatively long exposure time is necessary. This could be achieved by an appropriately long stabilization conduit, except for the fact that polyamides have a tendency to become unstable at relatively high temperatures, the result of which is that the winding of the coil on the mandrel no longer moves the previously wound coil ahead. Therefore, the coil as a whole no longer will be moved forward through the stabilizing conduit or zone. However, in such a long stabilizing conduit, if additional mechanical devices are provided to move the wound coil forward along the winding mandrel, such devices will cause the coil to be deformed if it is soft. Accordingly, it is extremely difficult to form polyamide filaments into wound coils, for example such as are required for link belts.

SUMMARY OF THE INVENTION

With the above discussion in mind, it is the object of the present invention to provide an apparatus of the above described type whereby it is possible to form a wound coil, even with polyamides which are very soft and unstable when heated, into wound coils with certainty and at a high production rate.

This object is achieved in accordance with the present invention by the provision of an apparatus in the form of a coiling head including a winding cone having extending therefrom a mandrel, whereby a monofilament of elastic material, such as a thermoplastic material, for example a polyester or polyamide, may be fed over the winding cone onto the mandrel in the form of a coil. A pair of conveyor means are located on opposite sides of the coil on the mandrel and define therebetween a stabilizing zone. The conveyor means move the coil along the mandrel through the stabilizino zone while heating and thereby stabilizing the coil. The mandrel extends throughout at least the length of the stabilizing zone. The conveyor means include respective heating elements located on opposite sides of the coil and respective planar members formed of a heat transmitting material and between which the coil is fed along the mandrel. Each planar member is in contact with the coil and a respective heating element, thereby transmitting heat from the heating element to the coil.

As a result of the temperature transfer through contact heat and the simultaneous transportation of the coil through the stabilizing zone by means of the heat transmitting conveyor means, the wound coil is rapidly heated so that the exposure time and thereby the overall length of the stabilizing conduit or zone can be reduced. Furthermore, no additional devices are needed to move the coil through the stabilizing zone. Coils produced by the apparatus of the present invention are distinguished by high accuracy and tolerances and enable frictionless processing into link belts such as employed for conveyor belts, screens, etc.

The conveyor means further include means for moving the planar members longitudinally of the mandrel and thereby for moving the coil along the mandrel. Each conveyor means preferably includes an endless element passed around two rollers and having a run in contact with the coil and defining the respective planar member. This arrangement enables monofilaments to be processed continuously.

Preferably, one roller of each conveyor means is driven and forms the respective moving means, and the other roller of each conveyor means is loosely supported and comprises an idler deflector roll. Two rollers of each conveyor means preferably are mounted such that the distance therebetween is adjustable.

In accordance with a preferred arrangement of the present invention, each endless element comprises a spring steel band, preferably having a thickness of from 0.05 to 0.5 mm. Such a thin spring steel band is sufficiently elastic for establishing an intimate contact with the wound coil, and also is relatively responsive to temperature changes of the respective heating element. However, in place of such spring steel bands, it is possible to employ endless elements in the form of metal link belts or segments mounted on chains.

In accordance with a further feature of the present invention, each heating element includes cartridge heaters the directions of radiation of which extend toward a wall of the respective heating element facing the stabilizing zone.

BRIEF DESCRIPTION OF THE DRAWINGS

Other objects, features and advantages of the present invention will be apparent from the following detailed description of a preferred embodiment thereof, with reference to the accompanying drawings, wherein:

FIG. 1 is a top plan view of an apparatus according to the present invention; and FIG. 2 is a cross-sectional view taken along line I—I of FIG. 1.

DETAILED DESCRIPTION OF THE INVENTION

A monofilament 1 of an elastic material, such as a thermoplastic material, is fed by means of a feed mechanism (not shown) to a coiling head 2 having a winding cone 3 with a winding mandrel 4 extending therefrom. By rotating the coiling head 2, the monofilament 1 is wound on the winding mandrel 4 in such a way that a just-wound winding contacts the last winding of a coil 5 already wound and located on the mandrel 4, moving forward such winding on the mandrel 4. The coil 5 then is grasped or seized by and between two conveyor means 6 and 7 which define therebetween a stabilizing conduit or zone 8. The conveyor means 6 and 7 have symmetric mirror-image configurations. Each conveyor means has a respective heating element 9, 10 in which are mounted respective cartridge heaters 11, 12 and 13, 14.

At the ends of the heating elements 9 and 10 are provided respective drive rolls 15, 16 and loosely supported idler deflector rolls 17, 18. A thin spring steel band 19, 20 is placed around each pair of rolls 15, 17 and 16, 18. Each band 19, 20 encloses the respective heating element 9, 10. On the runs or sides of the bands 19, 20 facing the stabilizing zone 8, the bands are in direct contact with the respective heating elements 9, 10. The distance between the heating elements 9, 10 is such that they serve as guide rails for the coil 5 which is being passed through the stabilizing zone 8. Thus, the run of each band 19, 20 which faces the stabilizing zone 8 defines a planar member which is fed along the mandrel and which is in contact with the coil 5 and with the respective heating element 9, 10, thereby transmitting heat from such heating element to the coil.

The spring steel bands preferably have a thickness of only 0.05 to 0.5 mm, and therefore the heat produced by the heating elements 9, 10 is transmitted efficiently by bands 19, 20 to the wound coil 5. At the same time, due to the uniform velocity between the bands 19, 20 and the coil 5 fed along the winding mandrel 4 during the movement of the coil through the stabilizing zone, there is direct contact between the coil 5 and the bands 19 and 20, thus resulting in an extremely favorable heat transfer by conduction.

During the entire movement through the stabilizing zone 8, no additional forces are applied to the coil 5 moved along the mandrel 4 by the bands 19, 20. Accordingly, the stabilizing zone 8 can be made relatively short due to the direct transfer of heat from the heating elements 9, 10. A reliable conveyance of the wound coil 5 during the stabilizing process can be assured.

The wound spiral coil can be cooled again after it emerges from the stabilizing zone.

As a result of the "movable" construction of the stabilizing zone 8, which itself provides for transportation of the wound spiral coil 5, the flow or production rate of the wound coil can be quite high without any damage or deleterious effect to the coil.

Although the present invention has been described and illustrated with respect to preferred features thereof, it is to be understood that many modifications and changes may be made to the specifically described and illustrated arrangement without departing from the scope of the present invention.

I claim:

1. An apparatus for producing a wound coil of an elastic material such as a polyester or polyamide which stabilizes upon the application of heat, said apparatus comprising:
    a coiling head including a winding cone having extending therefrom a mandrel, whereby a monofilament of elastic material may be fed over said winding cone onto said mandrel to form a coil;
    a pair of conveyor means, located on opposite sides of said coil on said mandrel, and defining therebetween a stabilizing zone for moving said coil along said mandrel through said stabilizing zone while heating and thereby stabilizing said coil;
    said mandrel extending throughout said stabilizing zone;
    said conveyor means including respective heating elements located on opposite sides of said coil; and
    said conveyor means further including respective planar members formed of a heat transmitting material and between which said coil is fed along said mandrel, each said planar member being in contact with said coil and a respective said heating element, thereby transmitting heat from said heating element to said coil.

2. An apparatus as claimed in claim 1, wherein said conveyor means further include means for moving said planar members longitudinally of said mandrel and thereby for moving said coil along said mandrel.

3. An apparatus as claimed in claim 2, wherein each said conveyor means includes an endless element passed around two rollers and having a run in contact with said coil and defining said planar member.

4. An apparatus as claimed in claim 3, wherein one said roller of each said conveyor means is driven and forms the respective said moving means, and the other said roller of each said conveyor means comprises an idler deflector roller.

5. An apparatus as claimed in claim 4, wherein said two rollers of each said conveyor means are mounted such that the distance therebetween is adjustable.

6. An apparatus as claimed in claim 3, wherein each said endless element comprises a spring steel band.

7. An apparatus as claimed in claim 6, wherein the thickness of each said band is from 0.05 to 0.5 mm.

8. An apparatus as claimed in claim 3, wherein each said endless element comprises a metal link belt.

9. An apparatus as claimed in claim 3, wherein each said endless element comprises segments mounted on chains.

10. An apparatus as claimed in claim 1, wherein each said heating element includes cartridge heaters having directions of radiation directed toward a wall of said heating element facing said stabilizing zone.

* * * * *